(12) United States Patent
Ramirez Toledo et al.

(10) Patent No.: US 8,900,504 B2
(45) Date of Patent: Dec. 2, 2014

(54) METHOD FOR MANUFACTURING A MANDREL

(75) Inventors: Jaime Ramirez Toledo, Santiago (CL);
Ricardo Abarca Melo, Santiago (CL);
Wilfredo San Martin Cisterna, Santiago (CL)

(73) Assignee: Weir Vulco, S.A. (CL)

( * ) Notice: Subject to any disclaimer, the term of this patent is extended or adjusted under 35 U.S.C. 154(b) by 241 days.

(21) Appl. No.: 12/735,215

(22) PCT Filed: Dec. 22, 2008

(86) PCT No.: PCT/AU2008/001895
§ 371 (c)(1),
(2), (4) Date: Sep. 14, 2010

(87) PCT Pub. No.: WO2009/079706
PCT Pub. Date: Jul. 2, 2009

(65) Prior Publication Data
US 2011/0012287 A1    Jan. 20, 2011

(30) Foreign Application Priority Data

Dec. 21, 2007 (CL) ................................. 3772-2007

(51) Int. Cl.
*B29C 33/76* (2006.01)
*B29C 33/40* (2006.01)
*B29C 33/38* (2006.01)
*B29L 31/24* (2006.01)

(52) U.S. Cl.
CPC ............. *B29C 33/3842* (2013.01); *B29C 33/40* (2013.01); *B29L 2031/243* (2013.01)

USPC ........................................................ 264/279.1

(58) Field of Classification Search
CPC ........................................................ B29C 33/76
USPC ........................................................ 264/279.1
See application file for complete search history.

(56) References Cited

U.S. PATENT DOCUMENTS

| | | | | |
|---|---|---|---|---|
| 3,580,044 | A | * | 5/1971 | De Voss et al. .................. 72/466 |
| 3,608,008 | A | * | 9/1971 | Soukup et al. ............... 264/45.5 |
| 3,795,559 | A | | 3/1974 | Horn et al. |
| 3,966,871 | A | * | 6/1976 | Schroder ........................ 264/318 |
| 4,246,363 | A | * | 1/1981 | Turner et al. .................. 521/163 |
| 4,581,086 | A | | 4/1986 | Gill et al. |
| 5,176,866 | A | * | 1/1993 | Tanaka et al. ................. 264/219 |
| 5,384,085 | A | | 1/1995 | Houser et al. |

FOREIGN PATENT DOCUMENTS

| | | |
|---|---|---|
| GB | 768753 | 2/1957 |
| RU | 1792840 | 2/1993 |
| WO | WO 2007016926 A1 * | 2/2007 |

* cited by examiner

*Primary Examiner* — Yogendra Gupta
*Assistant Examiner* — Alison Hindenlang
(74) *Attorney, Agent, or Firm* — Morriss O'Bryant Compagni

(57) ABSTRACT

A method of manufacturing a mandrel for use in the internal coating of a pipe elbow or bend comprises the steps of: (i) adjustably positioning a bendable elongate member in a hollow template for the pipe elbow or bend, whereby the elongate member is bent so as to extend generally centrally through the template; and (ii) introducing a flexible material into, and allowing the material to cure in a space between the elongate member and an internal surface of the template.

19 Claims, 6 Drawing Sheets

METHOD FOR MANUFACTURING A MANDREL

TECHNICAL FIELD

Disclosed is a method for manufacturing a mandrel which can subsequently be employed in a method for internally coating a pipe in the form of a bend or elbow, whereby a coating material is introduced to fill an annular space between the mandrel and the bend/elbow interior wall. The resultant coated pipe bend/elbow finds particular though not exclusive application in the mining and chemical industries when transporting abrasive, erosive and corrosive slurries, concentrates, tailings and other flowable solid and/or liquid mixtures. The term "pipe" as employed herein is intended to include ducts, conduits, pipelines, tubes, chutes, cylinders and so on.

BACKGROUND ART

The mining industry employs ore and concentrate pipes to transport ores, concentrates, tailings and other materials over long distances. Such pipes can be constructed from metal/metallic sections joined together to form an extended pipeline, and the ores being conveyed can often be in the form of wet slurries or even dry particulate solids.

Many changes of direction can occur along the path of such pipelines, both in the vertical and in the horizontal plane, requiring the use of elbows and bends. Some such elbows and bends can turn the pipeline up to angles of 180°, for example, in energy dissipation stations used with pipelines that fall from elevations exceeding 500 meters.

When transporting material such as abrasive/erosive/corrosive slurries, concentrates, tailings, a high level of pipe erosion can occur, especially at any bends in the pipeline, and most especially where the bends are located at the end of a pipeline fall. To avoid wear and/or corrosion, the piping can be internally coated with an elastomeric material (e.g. rubber, or a synthetic material such as polyurethane or the like).

Pipe diameters in such pipelines can vary between 50 and 500 mm, with it being desirable for each given pipe diameter to have a continuous coating of elastomeric material throughout its length. In some instances a specific uniform thickness is desirable and the coating thickness is selected specifically to the pipe diameter.

Coatings of rubber are most used for coarse particulate materials with a size above 2 mm due to the better resistance afforded by rubber at such particle sizes. For smaller particle size materials, polyurethane offers better resistance to abrasion. Thus, for materials such as concentrates and tailings, usually polyurethane is used as the coating material.

A uniform coating is more easily applied to straight sections of pipe, but less so in the bends and elbows, where it is difficult to achieve a uniform thickness, especially when the coating to be applied is of a synthetic type, such as polyurethane.

Co-pending PCT/AU2008/001757 discloses a method and apparatus for internally coating a pipe in the form of an elbow or bend.

A reference herein to prior art is not an admission that the art forms a part of the common general knowledge of a person of ordinary skill in the art, in Australia or elsewhere.

SUMMARY OF THE DISCLOSURE

In a first aspect there is disclosed a method for manufacturing a mandrel for use in the internal coating of a pipe elbow or bend. The method comprises the steps of:

(i) adjustably positioning a bendable elongate member in a hollow template for the pipe elbow or bend, whereby the elongate member is bent so as to extend generally centrally through the template;
(ii) introducing a flexible material into, and allowing the material to cure in, a space between the elongate member and an internal surface of the template.

The method can readily provide a mandrel for use in a method whereby a pipe in the form of an elbow or bend is internally coated, such as that disclosed in PCT/AU2008/001757. The mandrel so-produced is such that it can also readily be adjusted to suit the particular elbow or bend in which it is to be used. In this regard, the radius of curvature of the mandrel can be adapted (matched) to the internal radius of curvature of a selected pipe elbow or bend. Using the properties of the bendable elongate member and the flexible material, the mandrel that is manufactured by the new method can then be shaped (e.g. by hand or by a template/tool in a preset way) so as to define a uniform annular space between the elbow/bend internal wall and the mandrel's external surface.

In one embodiment of the method of manufacturing the mandrel, prior to step (i) an internal surface of a casing for the template can be coated with a lining material, with the lining material coating then defining the internal surface of the template. The selection of the template dimensions/configuration, as well as the lining material thickness, is such that, when the mandrel so-produced is subsequently located in a particular elbow or bend, the same thickness of coating can be reproduced in that elbow or bend.

Throughout this specification when the term "coating" is used it is interpreted to mean both linings of any thickness of material, from a single layer (such as one made of polyurethane) to a thick wear resistant liner (such as one made of rubber).

In one embodiment of the method of manufacturing the mandrel, prior to step (ii) the lining material that defines the template internal surface may have a release agent applied thereto. This can facilitate ease-of-removal of the subsequently formed (cured) mandrel.

In one embodiment of the method, during step (i), a first end of the elongate member can be connected, at a first template end, to a cable that extends through the template. This cable can then be pulled back through the template until the first elongate member end is located at a second opposite template end. During this pulling back through, the elongate member can be caused to be bent to its generally centrally extending orientation.

In one embodiment of the method, prior to step (i), transverse members can be attached to each end of the elongate member. Then, during step (i), the transverse members can be caused to be located adjacent to opposing ends of the template. Further, when so located, the transverse members can be mounted, in relation to the template ends, to secure the elongate member at its generally centrally extending position through the template.

In this embodiment each transverse member can be attached to a respective flange which is located in use externally of the template. This flange may be adapted for separate mounting to a respective end of the template. In this regard, each flange may be mounted to respective template mounting flanges defined at each template end.

In this embodiment each transverse member can take the form of a disc which is affixed to an end of the elongate member. Further, the elongate member can be selected to have a defined length, and the disc can be dimensioned such that, after step (i), the disc's edge is closely spaced from the template internal surface at its respective template end. In this regard, the length of elongate member can be selected such that an outside surface of the disc is aligned with a respective end of the template. If not, the method may comprise the further step of arranging one or more washers at each disc outside surface to ensure that an outside surface of the washer is aligned with a respective template end.

In this embodiment each disc and (when present) each washer can be provided with at least one mounting hole to enable it to be connected in relation to the template end. Further, in this embodiment at least one disc and (when present) at least one washer can be provided with at least one feed hole through which the flexible material can be introduced into the space between the elongate member and template internal surface. Typically two such holes are provided, one for feeding in the flexible material, and one for exhausting gases expelled from the progressively filling space.

In one embodiment, after the curing of step (ii), a cable can be connected in relation to an end of the elongate member. The cable can then be tensioned to withdraw the elongate member and attached cured flexible material from the template. This can provide the mandrel for use.

In one embodiment, prior to step (ii), the assembly of template with elongate member positioned can be preheated. This can facilitate pouring of the flexible material into the template, and can also result in a tension-free mandrel. For example, when the flexible material is a polyurethane, the assembly can be preheated for 2 to 10 hours at a temperature ranging between 80 and 120° C.

In one embodiment, during step (ii), and when the flexible material is a polyurethane, the material can be cured for 6 to 15 hours at a temperature ranging between 80 and 120° C.

In these embodiments the preheating and cure heating can be performed in an oven, or by employing a current of hot gas (e.g. air), by electromagnetic induction, or by radio frequency.

In one embodiment, after step (ii), the cured flexible material can be cooled in ambient air or by an induced flow of cooling fluid.

In an embodiment, the bendable elongate member may take the form of a metal/metallic rod.

In a second aspect there is disclosed a mandrel produced by the method of the first aspect.

BRIEF DESCRIPTION OF THE DRAWINGS

Notwithstanding any other forms that may fall within the scope of the method as set forth in the Summary, a specific embodiment of the method will now be described, by way of example only, and with reference to the accompanying drawings in which.

DETAILED DESCRIPTION OF A SPECIFIC EMBODIMENT

Figure 1:
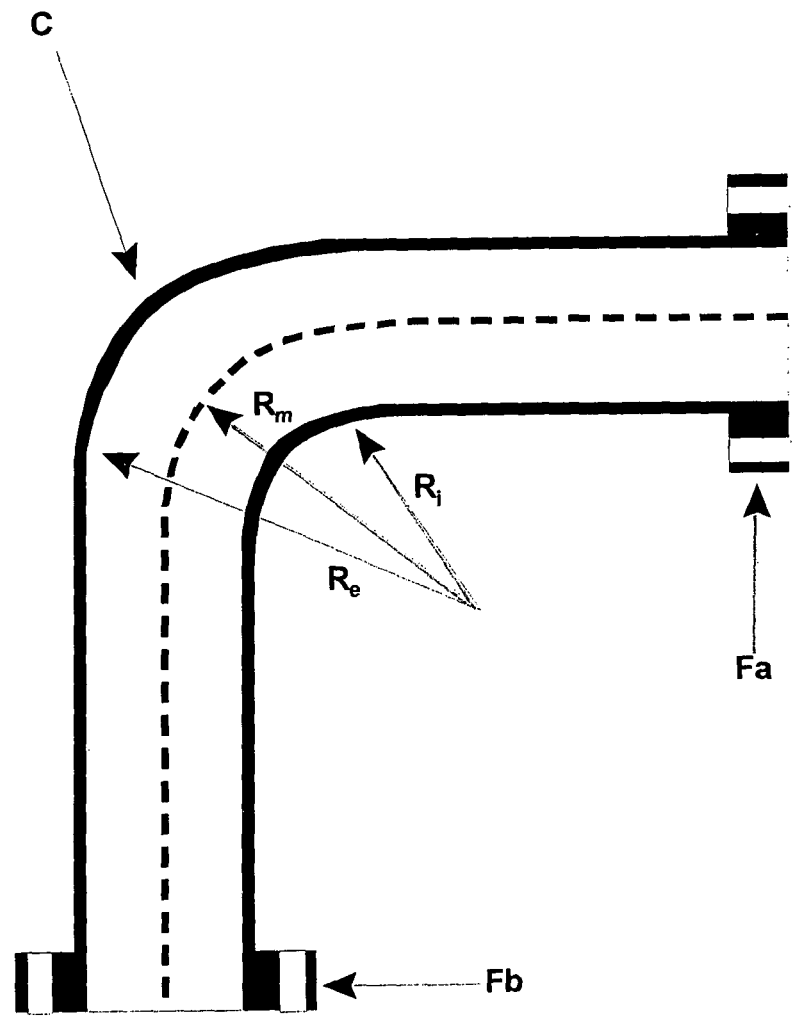
FIG. 1 shows a cross-section of a 90° elbow.

FIG. 1 shows a cross-section of a typical elbow C having joining flanges F, as well as having respective external, medium and internal curvature radii $R_e$, $R_m$ and $R_i$. The method disclosed herein can produce a mandrel which can be located inside such an elbow C, whereby an internal coating/lining for the elbow C can be formed around the mandrel.

Figures 2A, 2B, 2C:
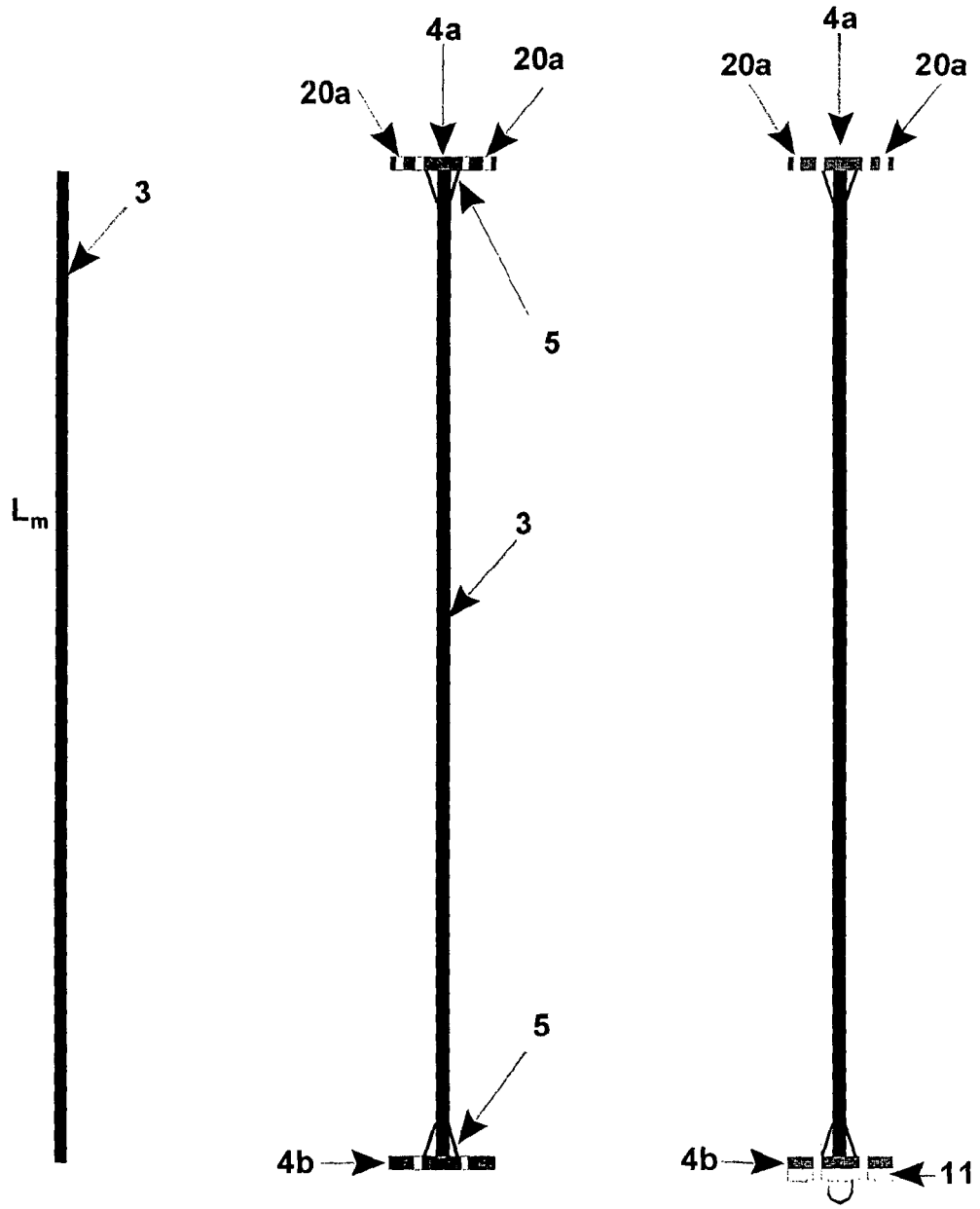
FIGS. 2a to 2c illustrates successive stages in the formation of a flexible core with discs affixed to opposing ends thereof.
Figure 3:
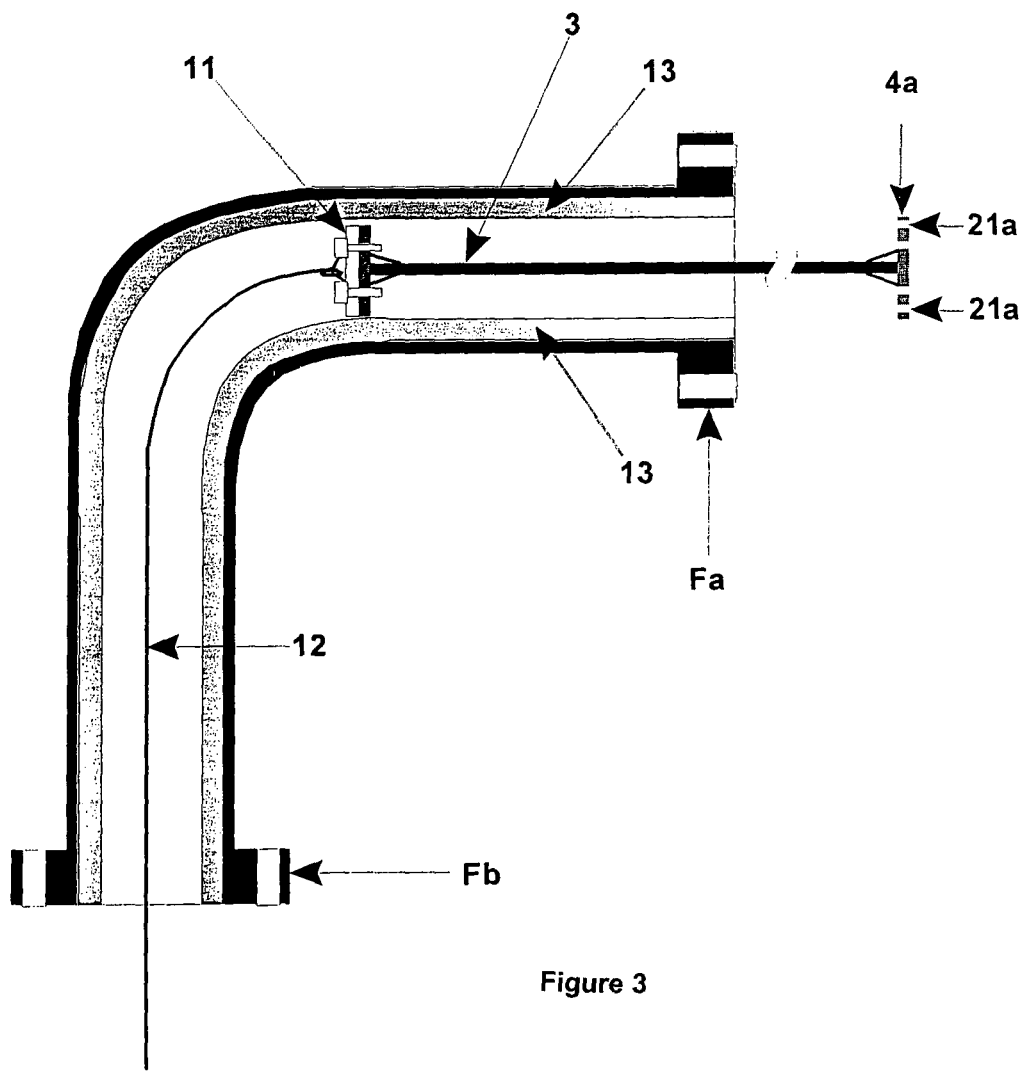
FIG. 3 illustrates an initial stage in the placement of the flexible core of FIG. 2c inside an elbow template.

An example of such a mandrel is denoted as 1 (FIG. 8) and is formed from a cylindrical body of flexible (e.g. elastomeric) material 2, such as a polyurethane. A bendable elongate member in the form of a flexible rod/core 3 extends generally through the centre of cylinder 2. The core 3 can be metallic or of polymeric fibre etc. As shown in FIGS. 2b and 2c, the mandrel 1 further comprises discs 4a and 4b that are joined to respective opposite ends of the core 3 by a fastening mechanism. In one embodiment the discs 4a and 4b are joined to the core 3 by web stiffeners 5, which can be welded or bolted to each of the core and discs (FIG. 2b).

In practice, each manufactured elbow or bend can present small differences with respect to each other elbow or bend, both in respect of its dimensions and its curvature radii. For this reason, when manufacturing the mandrel 1, the length $L_m$ of core 3 (see FIG. 2a) is selected to be shorter by 0 to 20 mm than a notional extended length of an elbow, according to radius $R_m$, in which the mandrel is to be used. This shorter length takes into account the disc width, and also allows for further adjustments to be made to the mandrel so as to suit the particular elbow or bend in which it is to be used.

In this regard, and as necessary, the length of the assembled core 3 and discs 4 can be adjusted to the notional extended length of the elbow by means of washers. The diameter of these washers can be the same as the mandrel and can be provided with holes that coincide with pouring holes 20a formed in the disc 4a.

It will also be seen that the diameter of discs 4a and 4b is selected to be smaller by 0 to 15 mm than the diameter of the mandrel to be manufactured. This allows the flexible body 2 to form around the sides of the disc, integrating them into the mandrel 1.

In accordance with a method for manufacturing mandrel 1, an elbow template T having flanges Fa and Fb is internally coated with a rubber lining 13 (FIGS. 3, 4, 5, 6 and 7). The thickness of the lining is selected to be equal to that of a desired coating (e.g. of polyurethane) with which it is intended to subsequently coat an elbow or bend using the mandrel 1. A releasing agent in the form of a chemical stripper is then applied over the surface of the rubber lining 13. This stripper facilitates subsequent removable of the formed/cured mandrel 1.

Figure 4:
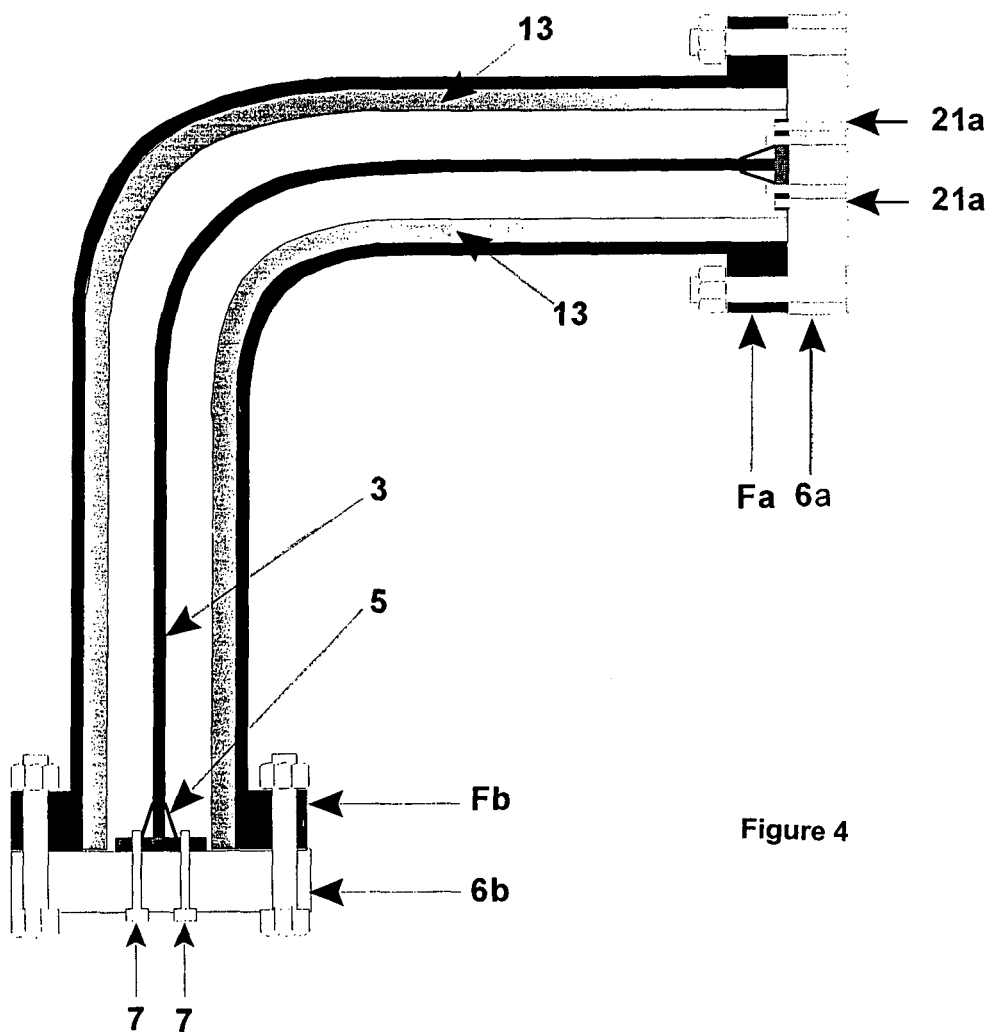
FIG. 4 shows the flexible core now placed in and secured to the elbow template at respective flanges thereof.
Figure 5:
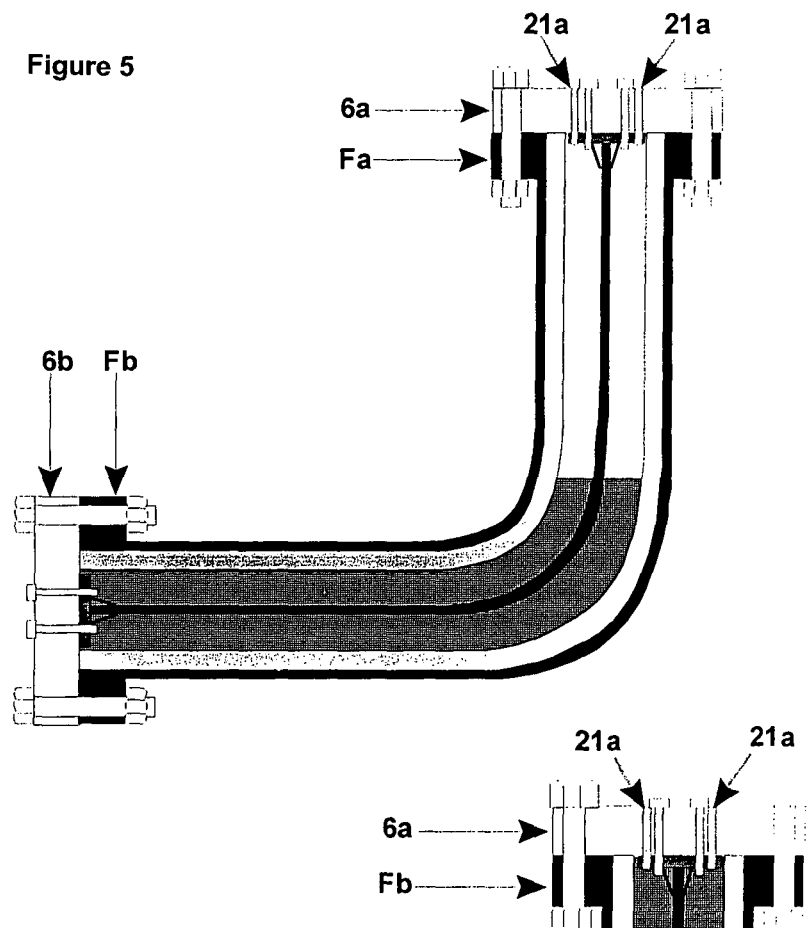
FIG. 5 shows the elbow template in a vertical orientation, having been half-filled with a polyurethane.
Figure 6:
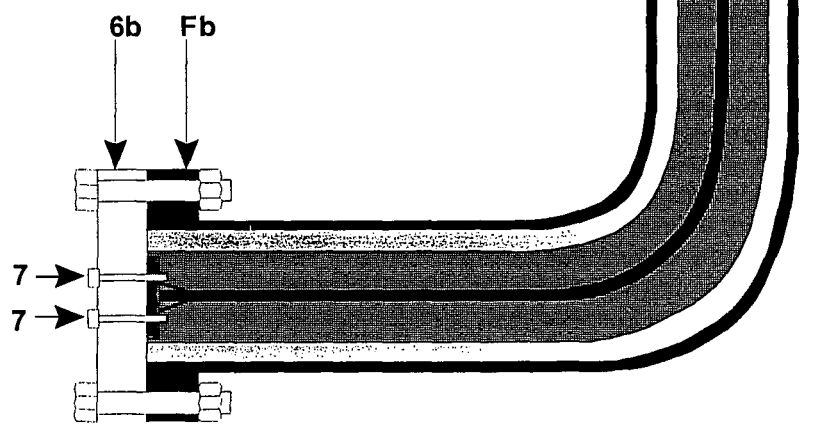
FIG. 6 shows the elbow template in a vertical orientation, now fully filled polyurethane.
Figure 7:
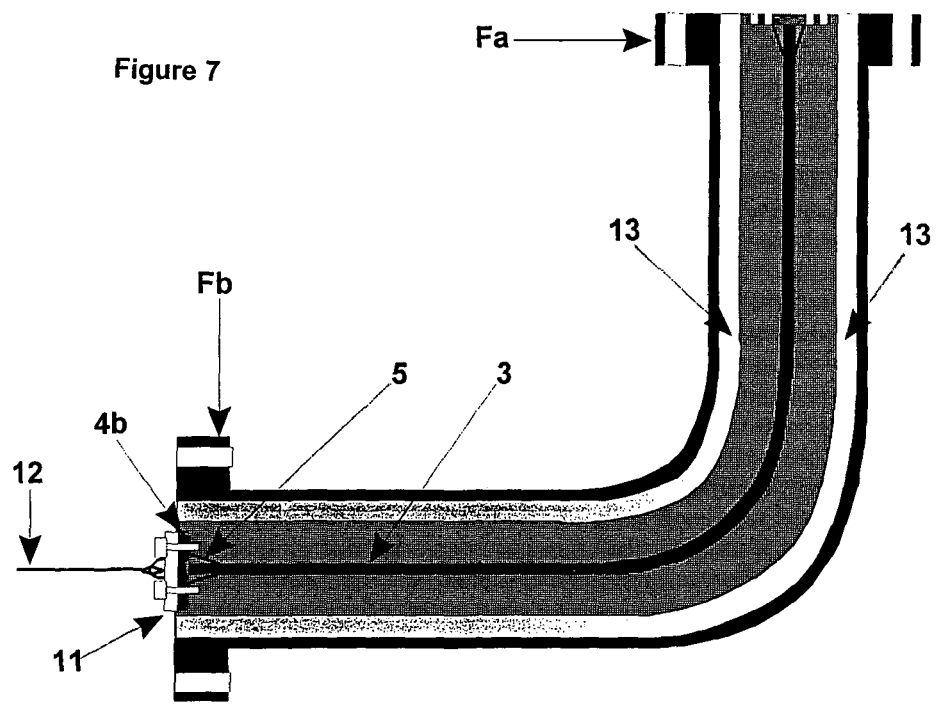
FIG. 7 shows the elbow template with a resultant cured mandrel thereinside, and with the flanges removed to enable mandrel removal.

The bendable core 3 is now introduced inside the elbow template T and is secured to the flanges Fa and Fb of the elbow template through the use of separate respective flanges 6a and 6b, which bolt to the flanges Fa and Fb, as shown in FIGS. 4, 5 and 6. The flanges 6a and 6b are connected to the core 3 via the discs 4a and 4b. In this regard, each disc 4a and 4b has two holes in which bolts 7 are received, the bolts extending from and securing the flanges 6a and 6b to the discs 4a and 4b.

The two pouring holes 20a in disc 4a align with holes 21a in the flange 6a. One hole is used for pouring (e.g. polyurethane) into the elbow template T to form the flexible cylindrical material around the core 3. The other hole functions as an exhaust.

To obtain better pouring and, further, to obtain a tension-free mandrel 1, the elbow template T with the core assembled therein can be preheated to a temperature ranging between 80 and 120° C. over a period of 2 to 10 hours.

During pouring, the elbow template T is orientated so that the flange 6a extends horizontally (FIG. 5). FIG. 5 shows an intermediate point during mandrel formation with polyurethane pouring into the elbow template T. FIG. 6 depicts the end point of the mandrel formation, when the pouring has filled the volume between the bendable core 3 and the rubber lining 13.

Upon completion of the pouring, the mandrel 1 has to be cured. To this effect, the mandrel 1 is heated to a temperature ranging between 80 and 120° C. over a period ranging from 6 to 15 hours.

Both the preheating and the curing stages can be performed inside an oven, or by employing a hot air current, by electromagnetic induction, or by radio frequency, or other technical equivalent for heating metallic components.

After curing, the elbow template T with the mandrel inside it is cooled. The cooling process may be performed naturally, in ambient air, or in a forced manner (e.g. by a pressurised coolant, or coolant flow).

In order to extract the mandrel 1, the flanges 6a and 6b are removed and a disc 11 is secured to the disc 4b. The disc 11 is provided with a connection point for engaging a hauling cable 12 (see FIG. 7). The hauling cable is tensioned to forcibly extract the mandrel 1 from the elbow template.

Figure 8:
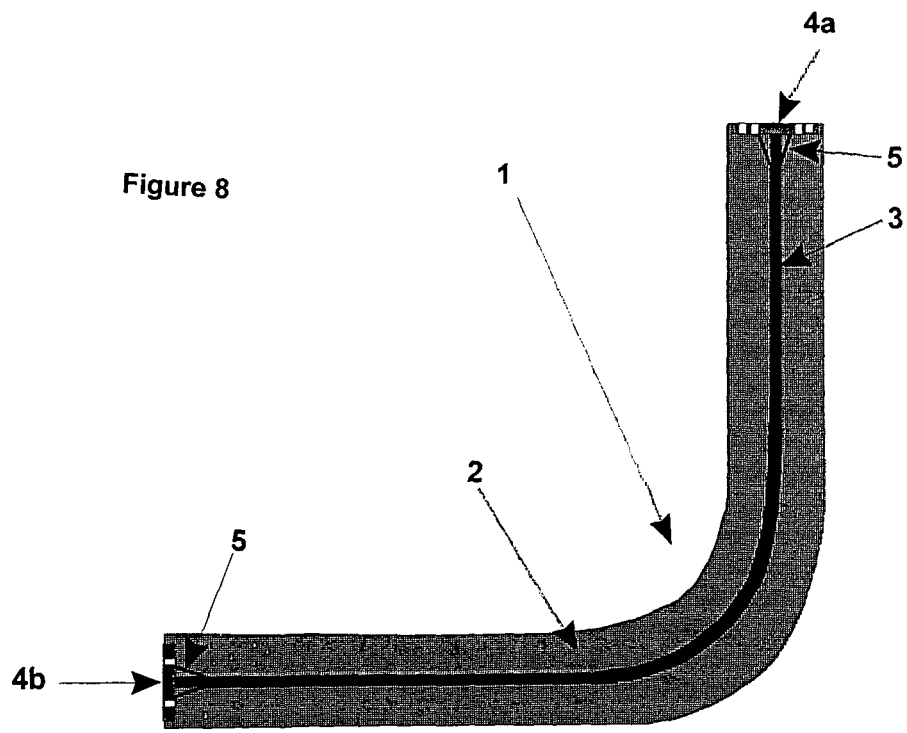
FIG. 8 shows the finished mandrel now removed the elbow template.

FIG. 8 shows the completed mandrel 1 removed form the elbow template T, having resumed its shape.

Example 1

Mandrel Formation Method

In an embodiment of the mandrel formation procedure, the placement and fastening of core 3 in the elbow template T comprised the following steps:

First, a flexible (e.g. metallic) core 3 was selected with a length shorter by 0 to 20 mm than a notional extended length of an elbow, according to radius $R_m$, in which the mandrel was to be used. A coating 13 (e.g. of rubber) was applied inside the elbow template T, with the coating having a desired thickness. A stripper was then sprayed over the exposed surface of the coating 13.

Discs 4a and 4b were secured to the core 3 by the web stiffeners 5 (FIG. 2b), and then the disc 11 was fastened to the disc 4b by the bolts as shown (FIG. 2c).

The core and discs assembly was placed inside the elbow template T, was connected to cable 12 and was submitted to tension (FIG. 3), pulling and bending the core until the assembly reached a suitable location (FIG. 4).

The flanges 6a and 6b were now fastened by bolts 7 to the discs 4a and 4b, and were also bolted to flanges Fa and Fb (FIG. 4). As necessary, the length of the core and discs assembly was adjusted using washers provided with holes that coincided with holes 20a and 21a.

The assembled elbow template was then preheated (e.g. in an oven) for between 2 to 10 hours at a temperature ranging between 80 and 120° C. The elbow template was then orientated so that the flange 6a was horizontal (FIG. 5). Then polyurethane was poured through one of the holes 21a, with air and gases in the template space exhausting through the other hole 21a (FIGS. 5 and 6) until the interior of the elbow template was filled. The polyurethane (FIG. 6) was then cured by heating (e.g. in an oven) for 6 to 15 hours at a temperature ranging between 80 and 120° C.

The now cured mandrel 1 inside the template was cooled (e.g. removed from the oven and exposed to a cooling air flow).

Once cooled, the bolts joining the flanges 6 and F, and the bolts 7 fastening the flanges 6 to the discs 4, were each removed. The disc 11 was re-secured to the disc 4b together with the hauling cable 12. The mandrel 1 was then extracted from the template T by applying tension to the cable 12.

Whilst the method has been described with reference to a specific embodiment, it should be appreciated that it can be embodied in many other forms. For example, in other arrangements the internal surface of the casing of the template need not be coated with a lining material, and the mandrel can be formed by introducing the flexible material into the interior space of the casing for the template and around the bendable elongate member. In such an arrangement the casing of the template used is of smaller diameter than the particular elbow or bend into which the so-formed mandrel is eventually to be placed such that the mandrel is of smaller cross-sectional dimension.

In still other forms, for example, the so-formed mandrel can be of any cross-sectional shape that is round, oval, square, rectangular, and so on. In still other arrangements the transverse members and cable that are attached to the bendable elongate member can be present in other shapes.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the method.

The invention claimed is:

1. A method for manufacturing a mandrel for use in the internal coating of a pipe elbow or bend, the method comprising the steps of:
   (i) positioning a bendable elongate member in a hollow template by connecting a first end of the elongate member at a first template end to a cable that extends through the template, the hollow template having a configuration corresponding to a pipe elbow or bend to be internally coated;
   (ii) pulling the cable back through the hollow template until the first elongate member end is located at a second opposite template end, whereby the elongate member is bent so as to extend generally centrally through the template;
   (iii) adjusting the elongate member within the template to assume the configuration of the hollow template and to arrange an outer surface of the elongate member in a spaced apart relationship with an internal surface of the template; and
   (iv) introducing a flexible material into a space between the outer surface of the adjusted elongate member and the internal surface of the template, and allowing the flexible material to cure in contact with the outer surface of the adjusted elongate member to form a mandrel comprising an elongate member and flexible material of selected thickness.

2. A method as claimed in claim 1 wherein, prior to step (i), an internal surface of a casing for the template is coated with a lining material, with the lining material coating defining the internal surface of the template.

3. A method as claimed in claim 2 wherein, prior to step (iv), the lining material that defines the template internal surface has a release agent applied thereto.

4. A method as claimed in claim 1 wherein, prior to step (i), transverse members are attached to each end of the elongate member; and wherein after step (ii) the transverse members are caused to be located adjacent to opposing ends of the template.

5. A method as claimed in claim 4 wherein the transverse members are mounted, in relation to the template ends, to secure the elongate member at its generally centrally extending position through the template.

6. A method as claimed in claim 5 wherein each transverse member is attached to a respective flange which is located in use externally of the template, and which flange is adapted for separate mounting to a respective end of the template.

7. A method as claimed in claim 6 wherein each flange is mounted to respective template mounting flanges defined at each template end.

8. A method as claimed in claim 4 wherein each transverse member is a disc which is affixed to an end of the elongate member, with the elongate member being selected to have a length, and with the disc being dimensioned such that, after step (ii), the edge of the disc is closely spaced from the template internal surface at a respective template end.

9. A method as claimed in claim 8 wherein the length of elongate member is selected such that an outside surface of the disc is aligned with a respective end of the template and, if not, the method comprises the further step of arranging one or more washers at each disc outside surface to ensure that an outside surface of the washer is aligned with a respective template end.

10. A method as claimed in claim 8 wherein each disc and, when present, each washer is provided with at least one mounting hole to enable it to be connected in relation to the template end; and at least one disc and, when present, at least one washer is provided with at least one feed hole through which the flexible material can be introduced into the space between the elongate member and template internal surface.

11. A method as claimed in claim 1 wherein, after step (iv), a cable is connected in relation to an end of the elongate member, with the cable being tensioned to withdraw from the template the elongate member together with the cured flexible material attached thereto.

12. A method as claimed in claim 1 wherein, prior to step (iv), the assembly of template with elongate member positioned therein is preheated.

13. A method as claimed in claim 12 wherein, when the flexible material is a polyurethane, the assembly is preheated for 2 to 10 hours at a temperature ranging between 80° C. and 120° C.

14. A method as claimed in claim 13 wherein the preheating and cure heating is performed in an oven, by a current of hot gas, by electromagnetic induction, or by radio frequency.

15. A method as claimed claim 1 wherein, during step (iv), and when the flexible material is a polyurethane, the material is cured for 6 to 15 hours at a temperature ranging between 80° C. and 120° C.

16. A method as claimed in claim 1 wherein, after step (iv), the cured flexible material is cooled in ambient air or by an induced flow of cooling fluid.

17. A method as claimed in claim 1 wherein the bendable elongate member is a metal/metallic rod.

18. A method for manufacturing a mandrel for use in the internal coating of a pipe elbow or bend, the method comprising the steps of:

(i) positioning a bendable elongate member in a hollow template, the hollow template having a configuration corresponding to a pipe elbow or bend to be internally coated, whereby the elongate member is bent so as to extend generally centrally through the template;

(ii) adjusting the elongate member within the template to assume the configuration of the hollow template and to arrange an outer surface of the elongate member in a spaced apart relationship with an internal surface of the template; and (iii) introducing a flexible material into a space between the outer surface of the adjusted elongate member and the internal surface of the template, and allowing the flexible material to cure in contact with the outer surface of the adjusted elongate member to form a mandrel comprising an elongate member and flexible material of selected thickness, wherein, prior to step (i), transverse members are attached to each end of the elongate member such that during step (i) the transverse members are caused to be located adjacent to opposing ends of the template, with each transverse member being a disc which is affixed to an end of the elongate member, and with the elongate member being selected to have a length, and with the disc being dimensioned such that, after step (i), the edge of the disc is closely spaced from the template internal surface at a respective template end;

wherein the length of the elongate member is selected such that an outside surface of the disc is aligned with a respective end of the template and, if not, the method comprises the further step of arranging one or more washers at each disc outside surface to ensure that an outside surface of the washer is aligned with a respective template end; and wherein each disc is provided with at least one mounting hole to enable it to be connected in relation to the template end, and at least one disc is provided with at least one feed hole through which the flexible material can be introduced into the space between the elongate member and template internal surface.

19. A method for manufacturing a mandrel for use in the internal coating of a pipe elbow or bend, the method comprising the steps of:

(i) positioning a bendable elongate member in a hollow template, the hollow template having a configuration corresponding to a pipe elbow or bend to be internally coated, whereby the elongate member is bent so as to extend generally centrally through the template;

(ii) adjusting the elongate member within the template to assume the configuration of the hollow template and to arrange an outer surface of the elongate member in a spaced apart relationship with an internal surface of the template;

(iii) introducing a flexible material into a space between the outer surface of the adjusted elongate member and the internal surface of the template, and allowing the flexible material to cure in contact with the outer surface of the adjusted elongate member to form a mandrel comprising an elongate member and flexible material of selected thickness; and (iv) connecting a cable in relation to an end of the elongate member, and tensioning the cable to withdraw from the template the elongate member together with the cured flexible material attached thereto.

\* \* \* \* \*